United States Patent [19]

Frische et al.

[11] Patent Number: 5,374,304
[45] Date of Patent: Dec. 20, 1994

[54] SPECIAL AMYLOSES AND THEIR USE FOR PRODUCING BIODEGRADABLE PLASTICS

[75] Inventors: Rainer Frische, Frankfurt am Main; Klaus Wollmann, Limburg; Renate Gross-Lannert, Dietzenbach; Judith Schneider, Hofheim; Bernd Best, Moerfelden, all of Germany

[73] Assignees: Battelle-Institut e.V., Frankfurt am Main, Germany; EMS-Chemie AG, Domat/Ems, Switzerland

[21] Appl. No.: 145,718

[22] Filed: Nov. 4, 1993

Related U.S. Application Data

[63] Continuation of Ser. No. 14,077, Feb. 4, 1993, abandoned, which is a continuation of Ser. No. 635,144, Dec. 31, 1990, abandoned.

Foreign Application Priority Data

Apr. 29, 1989 [DE] Germany .............................. 3914350

[51] Int. Cl.$^5$ ........................ C08L 3/06; C09D 103/06
[52] U.S. Cl. ................................... 106/210; 106/213; 264/217
[58] Field of Search ................. 106/210, 213; 264/217

[56] References Cited

U.S. PATENT DOCUMENTS 2,656,571 10/1953 Davis et al. .......................... 106/210
2,822,581 2/1958 Muetgeert et al. .................. 106/210

FOREIGN PATENT DOCUMENTS 869192 5/1961 United Kingdom ................ 106/210

OTHER PUBLICATIONS

W. B. Roth et al., *Food Technology*, "Some Properties of Hydroxypropylated Amylomaize Starch Films", vol. 21, pp. 72 to 74 (Jan. 1967).

*Primary Examiner*—David Brunsman
*Attorney, Agent, or Firm*—Spencer, Frank & Schneider

[57] ABSTRACT

The invention relates to special amyloses for producing biodegradable, clear, transparent and flexible plastic, in particular sheets and films, which a) are swellable, but not soluble, in cold water;
b) yield homogenous, flowable quasi-solutions without formation of gels if they are heated, with stirring, to temperatures above 80° C., at atmospheric pressure; during cooling to a temperature of 50° C., this state is maintained for at least five minutes, without gel formation or retrogradation, and the solution in a concentration between 5 and 25% is applicable to knife coating onto a plane surface with a gap width between 100 and 700 $\mu$m.

29 Claims, No Drawings

SPECIAL AMYLOSES AND THEIR USE FOR PRODUCING BIODEGRADABLE PLASTICS

This application is a continuation, application Ser. No. 08/014,077, filed Feb. 4, 1993, now abandoned, which is a continuation application of Ser. No. 07/635,144, filed Dec. 31st, 1990, now abandoned.

FIELD OF THE INVENTION

The present invention relates to special amyloses and their use for producing biodegradable, clear, transparent and flexible plastics.

TECHNOLOGY REVIEW

Using native raw materials and processing them into technical products has hitherto been of only minor importance, although such raw materials are available in sufficient quantities and at acceptable prices. In particular if aspects of environmental policy are taken into account, however, it is to be expected that these renewable raw materials will gain increasing importance in the future.

A raw material which is particularly interesting in this respect is starch, which is available in sufficient quantity and can be obtained from a wide variety of sources. Starch consists of the two components amylose and amylopectin. These components are polymers composed of glucose units, with chain lengths and molecular weights extending over a wide range. Whereas amylopectin has a branched-chain molecular structure, amylose is a long unbranched-chain molecule. Therefore starch, not least because of its structure, presents ideal properties as a raw material for technical products.

The film-forming properties of amylose have long been known. An essential disadvantage of these films produced from amylose consists in their brittleness and low elasticity. Accordingly, the conventional amylose films are not very stable, which has the negative effect of low crease resistance and tensile strength. Further disadvantages are their insufficient transparency, their rough surfaces and the sophisticated processes and equipment that are required for producing such films.

Attempts made to avoid these disadvantages by adding plasticizers, e.g. glycerol, sorbitol or, as described in German Patent No. 17 45 680, polyvinyl alcohol, however, did not improve the product properties so far that these methods could have achieved greater technical importance. The method of DE-PS 17 45 680 also requires that the hot amylose solution is placed on a heated substrate or pressed through a nozzle into a coagulating bath which contains an acid or salts for precipitating the amylose film.

Other methods of producing plastics describe the use of chemically modified amyloses. Thus, British Patent Specification No. 965 349 and U.S. Pat. No. 3,117,014 describe compositions which contain hydroxyalkyl amyloses or other derivatized amyloses and which are suited for thermoplastic processing. Let alone that these compositions are intended exclusively for producing thermoplastic films, the film properties with respect to transparency and ease of handling achieved with these mixtures cannot in the least be regarded as ideal. This is why these plastics so far have not been used for technical applications.

The object of the present invention therefore was to provide amyloses which enable, in a simple manner, production of clear, transparent and flexible plastics and molded parts with improved properties, in particular sheets and films; these are to be characterized mainly by easy biodegradability, so that their disposal by composting will no longer involve major difficulties and problems.

According to the invention, it was found that the use of specific amyloses, both in the production of films and sheets by a simplified casting process and in the production of thermoplastic molded parts, leads to products with extraordinary properties compared with prior art, i.e. properties which cannot be achieved in the same manner if conventional amyloses are used.

SUMMARY OF THE INVENTION

The present invention provides for special amyloses characterized in that a) they are swellable in cold water but not soluble; and, b) if heated with stirring above 80° C. at atmospheric pressure, they yield homogenous, flowable quasi-solutions typical of starch; and if the solution is cooled to a temperature of 50° C., this state is maintained for a period of at least 5 minutes, without retrogradation; and, in a concentration of 5% to 25%, by weight, such a solution is applicable to knife coating onto a planar surface with a gap width of between 100 $\mu$m and 700 $\mu$m. The invention also provides for molded plastic parts made from these amyloses. The invention further provides for a process of making these special amyloses through use of a formamide solution containing about 2% dichloroacetic acid, by weight, as well as a process for producing biodegradable, molded plastic parts made from these special amyloses.

Two objects of the present invention are special amyloses which are swellable, but not soluble in liquid water at a temperature of about 20° C. or below; and, yield a homogenous, flowable quasi-solution without the formation of gels when heated, with stirring, to a temperature of from about 80° C. to about 100° C., at atmospheric pressure; and, the homogenous, flowable state is maintained for at least 5 minutes without gel formation during cooling of the quasi-solution, from a temperature of between about 80° C. and about 100° C., to a temperature of about 50° C.; and, the quasi-solution, at a concentration of amylose from about 5% to about 25%, by weight, is applicable to knife coating onto a planar surface with a gap width between about 100 $\mu$m and about 700 $\mu$m. Another object is a process for preparing these special amyloses using a formamide and dichloroacetic acid solution. Another object is a simplified casting process for producing films and sheets on the basis of these special amyloses.

DETAILED DESCRIPTION OF THE INVENTION

The special amyloses according to the invention and as meant in the specification and in the claims, are complex mixtures of different chemical substances, preferably polymeric glycoses such as amylose and amylopectin, which show a behavior extraordinary for starches and amyloses. These special amyloses, which are natural polymers with statistical chain length distribution and a wide range of molecular weights, naturally are not accessible to accurate determination of the analytical structure; in the following, special amyloses are therefore understood as those fractions of amylose and amylose derivatives which are characterized by the following behavior:

a) They are swellable in cold water, but not soluble;

b) If heated with stirring above 80° C. at atmospheric pressure, they yield homogenous flowable quasi-solutions typical of starch, i.e. they do not form gels which are in homogenous with respect to flowability. If the solution is cooled to a temperature of 50° C., this state is maintained for a period of at least five minutes, without retrogradation. In a concentration of 5 to 25 weight %, such a solution is applicable to knife coating onto a planar surface with a gap width between 100 and 700 μm. By cold water it is meant liquid water at a temperature of about 20° C. or below. By "quasi-solution" it is meant the colloidal solution typical of aqueous starch solutions.

The special amyloses according to the invention can be obtained in different manners and from different sources. According to the invention, the special amyloses are obtained from high-amylose corn starches, i.e. starches with an amylose content above 65%, as are commercially available under the names Hylon VII (National Starch) or Eurylon 7 (Roquette), or from high-amylose pea starches.

The special amyloses are preferably obtained from the above starches according to a newly developed method by treatment with formamide solution which contains a small proportion of dichloroacetic acid. The enormous advantage of this method according to the invention is that it enables the starch to be decomposed and chemically modified in one step by treatment with formamide/dichloroacetic acid; this means that, after destruction of the granular structure of starch, in particular the molecular-weight and chain-length distribution of amylose is changed by decomposition. The terms "decompose" and "chemically modify" are meant to be taken as generally accepted in the art of starch processing.

According to the invention, the starch is dissolved in the 4- to 6-fold amount of formamide solution which contains 2 weight % dichloroacetic acid. The dissolution temperature depends essentially on the type of the starting starch used and ranges between 130° and 180° C. The solution is kept at this temperature for a period between 20 and 40 minutes, preferably 30 minutes. During this period the corn starch is decomposed, and starch degradation starts.

Subsequently, the solution is slowly cooled down to a temperature between 110° and 130° C., preferably 120° C., within a period of 10 to 20 minutes, and after that kept at this temperature for a period of 20 to 40 minutes, preferably 30 minutes. This leads to the molecular-weight and chain-length distributions which bring about the properties that are characteristic of the special amyloses according to the invention. The end point of the reaction is indicated by a slight discoloration of the reaction solution.

Further starch degradation is stopped by pouring the hot reaction solution into iced water. To precipitate the reaction product, a sufficient amount of precipitant, e.g. methanol or ethanol, is added to the mixture. The product is separated in a conventional manner, for example by aspiration. For further purification, the product is suspended in water, mixed with acetone, and the solution is again aspirated off. This procedure is repeated several times. After drying, the product has a moisture content between 5 and 15%, by weight.

The amylose thus produced has properties that cannot be achieved by the conventional decomposition and degradation methods.

According to the invention, special amyloses may also be specific hydroxyalkyl derivatives of amyloses. Such hydroxyalkyl derivatives are produced according to conventional methods, for example by derivatization in alkaline solution, derivatization in aqueous-alkaline suspension, or according to the method of British Patent specification No. 869 192. The experimental conditions are selected in a manner known to a person skilled in the art such that hydroxyalkyl amyloses with a degree of hydroxyalkyl substitution of the hydroxyl groups of amylose between 0.20 and 0.15 are obtained. A degree of substitution between 0.05 and 0.1 is preferred. According to the invention, the above high-amylose starches are again used as starting material for producing the desired derivatized amyloses. The special amyloses according to the invention can also be obtained, however, from potato starch according to the method of British Patent specification No. 869 192, taking into account the above reaction parameters; this method, however, involves much greater effort. The production of the special amyloses according to the invention is illustrated by the following examples.

In the production of plastics, the special amyloses are used in a mixture with appropriate plasticizers. Mixtures for achieving the object of the invention are composed of 60 to 97 weight % special amylose and 3 to 40 weight % of a plasticizer.

Preferably, the following composition is used: 70 to 95 weight % special amylose and 5 to 30 weight % of a plasticizer.

Particularly preferred is a composition containing 80 to 85 weight % special amylose and 15 to 20 weight % of a plasticizer.

Appropriate plasticizers are plasticizers known from the prior art, in particular polyhydric alcohols. Preferably used are glycerol, diethylene glycol, triethylene glycol, sorbitol, polyvinyl alcohol, citric acid oxide adduct or mixtures of these plasticizers.

The compositions according to the invention can be used both for thermoplastic molding of shaped parts or for producing sheets or films by casting.

Thermoplastic shaping of molded parts using compositions according to the invention is effected in a conventional manner as used for other thermoplastics according to current plastics-processing methods, for example by injection molding, extrusion, blow molding or by thermoplastic molding methods for producing sheets. The molded parts thus obtained are stable and flexible and show an excellent transparency.

According to the invention, the above-described compositions can also be used in a new method of producing cast sheets; these compositions have first to be dissolved in a sufficient amount of an appropriate solvent and subsequently filtered. It is suitable to effect dissolution and filtration at elevated temperature. Appropriate solvents are, for example, alcohols, aqueous formaldehyde or dimethyl sulfoxide. A preferred solvent, however, is water. The amount of solvent is suitably selected such that the solution on the one hand is still easy to handle and, on the other, the removal of the solvent for forming the sheets does not yet involve too much effort. The amount of solvent therefore, as a rule, will range between 70 and 100 weight parts, related to the total weight (100 parts) of the composition of special amylose and plasticizer.

It is of great importance for the production of the amylose films and sheets to filter the special amylose that is dissolved in the mixture of solvent and plasticizer prior to forming the sheet, because this obviously eliminates any defects, crystallites and impurities from the special amylose, which otherwise would cause recrystallization of the special amylose and thus deterioration of the quality of the resultant sheet or film.

After filtration, the film is formed by pouring the adequately warm solution onto a substrate, and by subsequent removal of the solvent. The sheets are suitably cast onto flat-ground materials, e.g. glass panes. Polyester sheets are preferably used, because the special amylose film is particularly easy to peel off.

The film cast in this way is suitably dried at a temperature of 20° to 70° C. Drying can be carried out both at atmospheric pressure and at reduced pressure.

This method yields sheets which, after drying, are easy to peel off from the substrate, and which are characterized by excellent clearness and light transmittance. At normal atmospheric humidity, the sheets are stable, transparent, flexible and crease resistant, without becoming subsequently turbid (retrogradation), and they withstand a bending angle of 180° C. without fracture of the fold. These properties are retained for months.

The special amylose according to the invention in the above compositions thus cannot only be processed into films and sheets by the above conventional plastics production processes, but particularly easily also by the casting method according to the invention. All the products according to the invention are characterized by satisfactory tensile strength and elongation; these properties are retained even by films or sheets aged over an extended period of time. As becomes obvious from the following embodiments, an increasing proportion of plasticizer reduces the tensile strength of the special amylose film, while the elongation is markedly increased.

The degradation behavior, the swelling capacity and the resistance to aging can be varied by the moisture content of the films and sheets. Thus, the embrittlement increases with decreasing moisture content. In the same way, the solubility of the sheets and films in water can be adjusted in a conventional manner by the type of plasticizer added, from soluble in cold water via soluble in hot water to slowly swellable and finally waterproof in cold water.

The sheets and films produced by the casting method according to the invention can be made in arbitrary thicknesses, the common film thickness ranging between 20 and 100 μm. It is possible to write on these films with plastic-sheet pens or ball-point pens; they are resistant to oils and fats as well as to organic solvents such as acetone, ethanol, esters, and chlorinated solvents.

The molded parts produced using the compositions according to the invention show a much better transparency and clearness than conventional molding compositions on the basis of normal amyloses or amylose derivatives. In addition, these materials, together with the plasticizers, are much better with respect to biodegradability. The films and sheets thus produced are in addition characterized by ecotoxicological acceptability, and by food, soil and skin compatibility, so that they can be used without any problem for packaging food. In addition, the sheets are resistant to photo-degradation, dyeable, can be bonded and sealed and are not hygroscopic. The sheets according to the invention can be used as alternatives to other conventional plastics, such as polyvinyl chloride and polypropylene.

The invention is illustrated by the following examples. All the percentages indicated relate to the total amount of special amylose and plasticizer.

EXAMPLE 1

Special amylose: 90.9 weight %
Ethylene glycol: 9.1 weight %

83.5 g water in a round-bottomed flask was mixed with 1.5 g ethylene glycol and heated to 90° C. 15 g special amylose was slowly added to this solution, with vigorous stirring. Then the solution was heated for 60 minutes to 100° C. The hot solution was filtered through a fritted glass filter, and a film from the filtrate, which still had a temperature of about 50° C., was cast onto a plane surface; this film was dried in a drying cabinet at a temperature between 40° and 70° C. After drying, a clear, transparent, elastic sheet of 100 μm thickness was peeled off from the surface.

EXAMPLE 2

Special amylose: 95.24 weight %
Ethylene glycol: 4.76 weight %

In accordance with the method described in Example 1 above, a cast sheet was produced from a solution of 84.25 g water, 0.75 g ethylene glycol and 15 g special amylose.

EXAMPLE 3

Special amylose: 80 weight %
Ethylene glycol: 20 weight %

In accordance with the method described in Example 1 above, a cast sheet was produced from a solution of 81:25 g water, 3.75 g ethylene glycol, and 15 g special amylose.

EXAMPLE 4

Special amylose: 95.24 weight %
Triethylene glycol: 4.76 weight %

In accordance with the method described in Example 1 above, a cast sheet was produced from a solution of 84.25 g water, 0.75 g triethylene glycol, and 15 g special amylose (hydroxyethyl amylose).

EXAMPLE 5

Special amylose: 90.9 weight %
Polyvinyl alcohol: 9.1 weight %

In accordance with the method described in Example 1, a cast sheet was produced from a solution of 83.5 g water, 1.5 g polyvinyl alcohol, and 15 g special amylose (hydroxyethyl amylose).

EXAMPLE 6

Special amylose: 66.7 weight %
Ethylene glycol: 33.3 weight %

In accordance with the method described in Example 1, a cast sheet was produced from a solution of 77.5 g water, 7.5 g ethylene glycol, and 15 g special amylose (hydroxyethyl amylose).

EXAMPLE 7

Special amylose: 90.9 weight %
Triethylene glycol: 9.1 weight %

In accordance with the method described in Example 1, a cast sheet was produced from a solution of 83.5 g water, 1.5 g triethylene glycol, and 15 g special amylose (hydroxyethyl amylose).

EXAMPLE 8

Special amylose: 90.9 weight %
Glycerol: 9.1 weight %
A cast sheet was produced according to Example 1, using 9.1 weight % glycerol as plasticizer.

EXAMPLE 9

Special amylose: 83.4 weight %
Glycerol: 16.6 weight %
A cast sheet was produced according to Example 1, using 16.6 weight % glycerol as plasticizer. The solution was filtered under vacuum.

EXAMPLE 10

Special amylose: 80 weight %
Glycerol: 20 weight %
A cast sheet was produced according to Example 1, using 20 weight % glycerol as plasticizer. The solution was filtered under vacuum.

The properties of the cast sheets described in the above examples as well as in the reference examples are compiled in the following table.

TABLE

| Plasticizer additive | Light transmission (%) (DIN 67507) | Special amylose films aged for 24 hrs | | Special amylose films aged for 24 hrs | |
|---|---|---|---|---|---|
| | | Film thickness ($\mu$m) | Tensile strength (kg/cm$^2$) | Film thickness ($\mu$m) | Elongation (%) |
| 4.76% Ethylene glycol | 89.95 | 91.6 | 47.5 | 107.5 | 9.3 |
| 9.1% Ethylene glycol | 84.93 | 95.0 | 45.3 | 112.5 | 11.7 |
| 20% Ethylene glycol | 89.53 | 93.3 | 25.4 | 105.8 | 6.3 |
| 33.3% Ethylene glycol | 89.10 | 100.0 | 6.3 | 105.0 | 50.0 |
| 4.76% Triethylene glycol | 89.43 | 71.6 | 51.3 | 94.2 | 7.8 |
| 9.1% Triethylene glycol | 87.50 | 56.0 | 38.2 | 73.0 | 7.8 |
| 9.1% Polyvinyl alcohol | 62.74 | 93.3 | 46.7 | 101.7 | 7.2 |
| 9.1% Glycerol | 88.96 | 50.0 | 57.3 | 68.3 | 8.8 |
| 16.6% Glycerol | 89.95 | 76.6 | 28.6 | 89.1 | 10.0 |
| 20% Glycerol | 88.10 | 138.3 | 19.7 | 197.5 | 14.7 |

EXAMPLE 11

Production of special amylose by treatment with formamide/dichloroacetic acid 120 g high-amylose corn starch Hylon VII (National Starch) is dissolved, with stirring, at 145° to 150° C. (internal temperature), in 588 g formamide solution that contains 12 g dichloroacetic acid, and kept at this temperature for 30 minutes. The solution is then cooled down to 120° C. (internal temperature) (duration: about 15 minutes) and kept at this temperature for another 30 minutes. Subsequently, the hot reaction solution is poured into about 300 ml iced water. About 200 ml ethanol is added to this mixture to precipitate the product, and the solution is then aspirated off. For purification, the solid residue is suspended in 1 liter water and precipitated with the same amount of acetone. This procedure is repeated twice. After drying at room temperature or in the drying cabinet, a white voluminous powder is obtained.

Yield: 180 g special amylose

EXAMPLE 12

Production of special amylose by derivatization in alkaline solution 48.6 g high-amylose corn starch Hylon VII or Eurylon 7 is mixed with 150 ml water and introduced into 1200 ml 1N NaOH. 13.2 g ethylene oxide (liquefied is slowly added dropwise to this solution with vigorous stirring, so that the internal temperature does not rise about 20° C., and thereafter stirred for 8 hours. This results in conversion of the starch into low-ethoxylated starch. The reaction solution is neutralized with concentrated HCl, reduced to a volume of 600 ml, and dialyzed against distilled water diaphragm: Visking Dyalyse Tubing) for 24 hours. Subsequently, the product is precipitated with methanol and sucked off. In this process, disturbing accompanying substances, e.g. in particular salts and water-soluble starch fragments, are removed. For purification, the product is suspended in acetone, sucked off and dried.

Yield: 40 g special amylose (hydroxyethyl amylose).

EXAMPLE 13

Production of special amylose by ethoxylation according to the method of British Patent Specification No. 869 192

324 g Hylon VII is added batchwise to 1650 ml 1N NaOH and stirred for 2.5 hours. Subsequently, 30 g ethylene oxide (liquefied) is slowly added dropwise and thereafter stirred for 2¼ hours. This is followed by neutralization with concentrated sulfuric acid. The neutralized starch solution is added to a solution of 700 g MgSO$_4$×7 H$_2$O in 2000 ml water and stirred for 20 hours. The resultant turbidities are separated (by centrifugation). The solution is mixed with an additional amount of 2 liter MgSO$_4$ solution (700 g MgSO$_4$ in two liters). After 24 hours, a white, flaky precipitate has formed. The precipitate is filtered off, washed with cold water to remove MgSO$_4$, and dried.

Yield: 200 g special amylose (hydroxyethyl amylose).

EXAMPLE 14

Production of special amylose by derivatization in aqueous-alkaline suspension 1000 g high-amylose corn starch Hylon VII or Eurylon 7 or high-amylose pea starch is added batchwise to a solution of 1200 ml water, 13 g NaOH and 150 g Na$_2$SO$_4$, and then 360 g propylene oxide is slowly added dropwise. Then, the solution is kept at 40° C. internal temperature for 8 hours, with vigorous stirring. This is followed by neutralization with 1N H$_2$SO$_4$, and sucking off. The product is suspended in about 2 liter methanol and again sucked off. This procedure is repeated twice. The isolated product is dried in air or in the drying cabinet (40° C.).

Yield: 1215 g special amylose (hydroxpropyl amylose).

EXAMPLE 15

Production of thermoplastic sheet 20 g of the special amylose obtained according to Examples 11 to 14 is intimately mixed with 4.45 g ethylene glycol as plasticizer in a kneading machine and pressed into a thin, transparent and elastic sheet at a temperature of 100° C., at a molding pressure of 10 t, and for a pressing time of 30 minutes, using a heated press.

What is claim is:

1. A special amylose, obtainable, in one step, by chemically modifying starch comprising a mixture of amylose and amylopectine with an amylose content greater than about 65%, by treatment with a solution comprising formamide and about 2%, by weight, dichloroacetic acid and recovering special amylose;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling or said quasi-solution, from a temperature of between about 80° C. and about 100° C., to a temperature of about 50° C.; and, said quasi-solution, at a concentration of said amylose from about 5% to about 25% by weight, being applicable to knife coating onto a planar surface with a gap width between about 100 $\mu$m and about 700 $\mu$m.

2. The special amylose set forth in claim 1, said special amylose being obtained by chemically modifying high-amylose corn starch or high-amylose pea starch by treating said starch with a solution comprising formamide and about 2% dichloroacetic acid by weight, as compared to the weight of said solution and recovering special amylose.

3. A composition for producing plastics comprising from about 3% to about 40% by weight of a plasticizer and from about 60% to about 97% by weight of special amylose, said special amylose being obtainable, in one step, by chemically modifying starch comprising a mixture of amylose and amylopectine with an amylose content greater than about 65%, by treatment with a solution comprising formamide and about 2%, by weight, dichloroacetic acid and recovering special amylose;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and, said quasi-solution, at a concentration of said amylose from about 5% to about 25% by weight, being applicable to knife coating onto a planar surface with a gap width between about 100 $\mu$m and about 700 $\mu$m.

4. The composition set forth in claim 3, said composition comprising from about 70% to about 95% by weight special amylose and from about 5% to about 30% by weight plasticizer.

5. The composition as set forth in claim 3, said composition comprising from about 80% to about 85% by weight special amylose and from about 15% to about 20% by weight plasticizer.

6. In a process for the thermal shaping of a molded plastic part, the improvement comprising molding a composition comprising from about 3% to about 40% by weight of a plasticizer and from about 60% to about 97% by weight of special amylose, obtainable, in one step, by chemically modifying starch comprising a mixture of amylose and amylopectine with an amylose content greater than about 65%, by treatment with a solution comprising formamide and about 2%, by weight, dichloroacetic acid and recovering special amylose;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and said quasi-solution, at a concentration of said amylose from about 5% to about 25% by weight, being applicable to knife coating onto a planar surface with a gap width between about 100 $\mu$m and about 700 $\mu$m.

7. A process for producing amylose films and sheets comprising:

a) dissolving, in an appropriate solvent, a composition comprising from about 3% to about 40% by weight of a plasticizer and from about 60% to about 97% by weight of special amylose, obtainable, in one step, by chemically modifying starch comprising a mixture of amylose and amylopectine with an amylose content greater than about 65%, by treatment with a solution comprising formamide and about 2%, by weight, dichloroacetic acid;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and, said quasi-solution, at a concentration of said amylose from about 5% to about 25% by weight, being applicable to knife coating onto a planar surface with a gap width between about 100 $\mu$m and about 700 $\mu$m;

b) filtering the resultant solution of step (a);

c) casting the resultant solution of step (b) onto an appropriate substrate to form a cast sheet of said resultant solution; and d) drying said cast sheet by removing all but from about 5% to about 15% by weight of said appropriate solvent as compared to the weight of said composition.

8. The process as set forth in claim 7, said dissolving step (a) additionally comprising heating said appropriate solvent and said composition to a temperature of about 100° C. for a time sufficient to effect dissolution of said composition in said appropriate solvent.

9. The process as set forth in claim 7, step (a): wherein said appropriate solvent is water.

10. A molded plastic part comprising a special amylose, obtainable, in one step, by chemically modifying starch comprising a mixture of amylose and amylopectine with an amylose content greater than about 65%, by treatment with a solution comprising formamide and about 2%, by weight, dichloroacetic acid and recovering special amylose;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and, said quasi-solution, at a concentration of said amylose from about 5% to about 25% by weight, being applicable to knife coating onto a planar surface with a gap width between about 100 $\mu$m and about 700 $\mu$m.

11. A special amylose, obtainable in one step by chemically modifying starch comprising a mixture of amylose and amylopectine with a amylose content greater than about 65%, by hydroxyalkyl derivatization of the amylose in said starch and recovering special amylose;

said degree of hydroxyalkyl substitution in said hydroxyalkyl amylose being from about 0.05 to about 0.15;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C., and, said quasi-solution, at a concentration of said amylose from about 5% to about 25% by weight, being applicable to knife coating onto a planar surface with a gap width between about 100 $\mu$m and about 700 $\mu$m.

12. The special amylose set forth in claim 11, said special amylose comprising hydroxyalkyl amylose, the hydroxyalkyl groups of said hydroxyalkyl amylose comprising from 1 to about 4 carbons.

13. The special amylose set forth in claim 12, said hydroxyalkyl amylose selected from the group consisting of a hydroxyethyl amylose and a hydroxypropyl amylose.

14. A composition for producing plastics comprising from about 3% to about 40% by weight of a plasticizer and from about 60% to about 97% by weight of special amylose, said special amylose being obtainable, in one step, by chemically modifying starch comprising a mixture of amylose and amylopectine with an amylose content greater than about 65%, by hydroxyalkyl derivatization of the amylose of said starch and recovering special amylose;

said degree of hydroxyalkyl substitution in said hydroxyalkyl amylose being from about 0.05 to about 0.15;

said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and, said quasi-solution, at a concentration of said amylose from about 5% to about 25% by weight, being applicable to knife coating onto a planar surface with a gap width between about 100 $\mu$m and about 700 $\mu$m.

15. The composition set forth in claim 14, wherein said special amylose comprises hydroxyalkyl amylose, the hydroxyalkyl groups of said hydroxyalkyl amylose comprising from 1 to about 4 carbons.

16. The composition set forth in claim 15, said hydroxyalkyl amylose selected from the group consisting of a hydroxyethyl amylose and a hydroxypropyl amylose.

17. In a process for the thermal shaping of a molded plastic part, the improvement comprising molding a composition comprising from about 3% to about 40% by weight of a plasticizer and from about 60% to about 97% by weight of special amylose, obtainable, in one step, by chemically modifying starch comprising a mixture of amylose and amylopectine with an amylose content greater than about 65%, by hydroxyalkyl derivatization of the amylose of said starch and recovering special amylose;

said degree of hydroxyalkyl substitution in said hydroxyalkyl amylose being from about 0.05 to about 0.15;

special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;

the homogenous, flowable state being maintained for at least five minutes without gel formation during cooling of said quasi-solution, from a temperature of between about 80° C. and about 100° C., to a temperature of about 50° C.; and said quasi-solution, at a concentration of said amylose from about 5% to about 25% by weight, being applicable to knife coating onto a planar surface with a gap width between about 100 $\mu$m and about 700 $\mu$m.

18. The process set forth in claim 17, wherein said special amylose comprises hydroxyalkyl amylose, the hydroxyalkyl groups of said hydroxyalkyl amylose comprising from 1 to about 4 carbons.

19. The process set forth in claim 18, said hydroxyalkyl amylose selected from the group consisting of a hydroxyethyl amylose and a hydroxypropyl amylose.

20. A process for producing amylose films and sheets comprising:
  a) dissolving, in an appropriate solvent, a composition comprising from about 3% to about 40% by weight a plasticizer and from about 60% to about 97% by weight a special amylose, obtainable, in one step, by chemically modifying starch comprising a mixture of amylose and amylopectine with an amylose content greater than about 65%, by hydroxyalkyl derivatization of the amylose of said starch;
    said degree of hydroxyalkyl substitution in said hydroxyalkyl amylose being from about 0.05 to about 0.15;
    said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;
    the homogenous, flowable state being maintained for at least five minutes without gel formation during cooling of said quasi-solution, from a temperature of between about 80° C. and about 100° C., to a temperature of about 50° C.; and,
    said quasi-solution, at a concentration of said amylose from about 5% to about 25% by weight, being applicable to knife coating onto a planar surface with a gap width between about 100 μm and about 700 μm;
  b) filtering the resultant solution of step (a);
  c) casting the resultant solution of step (b) onto an appropriate substrate to form a cast sheet of said resultant solution; and
  d) drying said cast sheet by removing all but from about 5% to about 15% by weight of said appropriate solvent as compared to the weight of said composition.

21. The process as set forth in claim 20, step (a) comprising:
  dissolving, in an appropriate solvent, a composition comprising from about 3% to about 40% by weight of a plasticizer and from about 60% to about 97% by weight of special amylose, obtainable, in one step, by chemically modifying starch comprising a mixture of amylose and amylopectine with an amylose content greater than about 65%, by hydroxyalkyl derivatization of the amylose of said starch;
  said special amylose comprising hydroxyalkyl amylose, the hydroxyalkyl groups of said hydroxyalkyl amylose comprising from 1 to about 4 carbons.

22. The process set forth in claim 21, wherein said hydroxyalkyl amylose is selected from the group consisting of a hydroxyethyl amylose and a hydroxypropyl amylose.

23. The process set forth in claim 20, step (a):
  wherein said appropriate solvent is water.

24. The process as set forth in claim 20, said dissolving step (a) additionally comprising heating said appropriate solvent and said composition to a temperature of about 100° C. for a time sufficient to effect dissolution of said composition in said appropriate solvent.

25. The process as set forth in claim 20, the drying of said cast sheet in step (d) being at a temperature of from about 20° C. to about 70° C.

26. The process as set forth in claim 20, the drying of said cast sheet in step (d) being at a pressure below atmospheric pressure.

27. A molded plastic part comprising a special amylose, obtainable, in one step, by chemically modifying starch comprising a mixture of amylose and amylopectin with an amylose content greater than 65%, by hydroxyalkyl derivatization of the amylose of said starch, and recovering special amylose;
  said degree of hydroxyalkyl substitution in said hydroxyalkyl amylose being from about 0.05 to about 0.15;
  said special amylose being swellable, but not soluble, in liquid water at a temperature of about 20° C. or below and yielding a homogenous, flowable quasi-solution without formation of gels when heated, with stirring, to a temperature of from about 80° C. to about 100° C., at atmospheric pressure;
  the homogenous, flowable state being maintained for at least five minutes without gel formation during cooling of said quasi-solution, from a temperature of between about 80° C. and about 100°, to a temperature of about 50° C.; and,
  said quasi-solution, at a concentration of said amylose from about 5% to about 25% by weight, being applicable to knife coating onto a planar surface with a gap width between about 100 μm an about 700 μm.

28. The molded part set forth in claim 27, wherein said special amylose comprises hydroxyalkyl amylose, the hydroxyalkyl groups of said hydroxyalkyl amylose comprising from 1 to about 4 carbons.

29. The molded part set forth in claim 28, said hydroxyalkyl amylose selected from the group consisting of a hydroxyethyl amylose and a hydroxypropyl amylose.

* * * * *